(12) United States Patent
Morley

(10) Patent No.: US 8,776,986 B2
(45) Date of Patent: Jul. 15, 2014

(54) SINGULATOR

(75) Inventor: Bruce Thomas Morley, Victoria (AU)

(73) Assignee: MAF Agrobotic, Montauban (FR)

( * ) Notice: Subject to any disclaimer, the term of this patent is extended or adjusted under 35 U.S.C. 154(b) by 25 days.

(21) Appl. No.: 13/585,143

(22) Filed: Aug. 14, 2012

(65) Prior Publication Data

US 2013/0043104 A1 Feb. 21, 2013

(30) Foreign Application Priority Data

Aug. 16, 2011 (AU) ............................. 2011903264

(51) Int. Cl.
| | | |
|---|---|---|
| B65G 47/24 | (2006.01) | |
| B65G 47/244 | (2006.01) | |
| B65G 47/31 | (2006.01) | |
| B65G 47/68 | (2006.01) | |
| B65G 15/44 | (2006.01) | |

(52) U.S. Cl.
CPC .......... *B65G 47/682* (2013.01); *B65G 47/2445* (2013.01); *B65G 47/31* (2013.01); *B65G 15/44* (2013.01)
USPC ........ 198/461.1; 198/382; 198/403; 198/411; 198/415; 198/416; 198/604; 198/620; 198/623; 198/626.1

(58) Field of Classification Search
USPC ................. 198/373, 382, 403, 411, 415, 416, 198/419.2, 461.1, 577, 579, 604, 620, 623, 198/626.1, 626.2, 818, 822, 823, 825, 198/459.1, 459.8, 483.1, 867.1, 1
See application file for complete search history.

(56) References Cited

U.S. PATENT DOCUMENTS

| | | | |
|---|---|---|---|
| 3,462,001 A | 8/1969 | Boyce | |
| 4,720,006 A * | 1/1988 | Lenherr | 198/415 |
| 4,901,842 A * | 2/1990 | Lemboke et al. | 198/415 |
| 5,751,833 A * | 5/1998 | Blit et al. | 382/110 |
| 7,311,191 B2 * | 12/2007 | Bahr | 198/397.06 |
| 7,407,056 B2 * | 8/2008 | Lutz | 209/617 |
| 7,531,758 B2 * | 5/2009 | Grove | 177/119 |
| 2007/0068772 A1 | 3/2007 | Bahr | |

FOREIGN PATENT DOCUMENTS

| | | |
|---|---|---|
| DE | 941477 C | 4/1956 |
| DE | 1916767 U | 5/1965 |
| FR | 2725704 A1 | 4/1996 |
| JP | 1051177 A | 2/1989 |
| JP | 8301435 A | 11/1996 |

OTHER PUBLICATIONS

European Search Report, dated Dec. 5, 2012, from corresponding EP application.

* cited by examiner

*Primary Examiner* — Leslie A Nicholson, III
(74) *Attorney, Agent, or Firm* — Young & Thompson

(57) ABSTRACT

A singulator for use with fruit handling equipment including spaced fruit supports driven at a particular speed, the singulator causing the fruit to assume single file for transfer to the fruit supports, the singulator including a first pair of belts arranged in a V formation travelling at different speeds, wherein the first pair of belts merges into a second pair of belts arranged in a V formation and both travelling at about the speed of the fruit supports, and wherein the second pair of belts is adapted to be operated so as to transfer the fruits substantially at the same speed as the fruit supports, whereby fruit are transferred to the fruit supports in single file whilst moving at the same speed as the fruit supports.

19 Claims, 4 Drawing Sheets

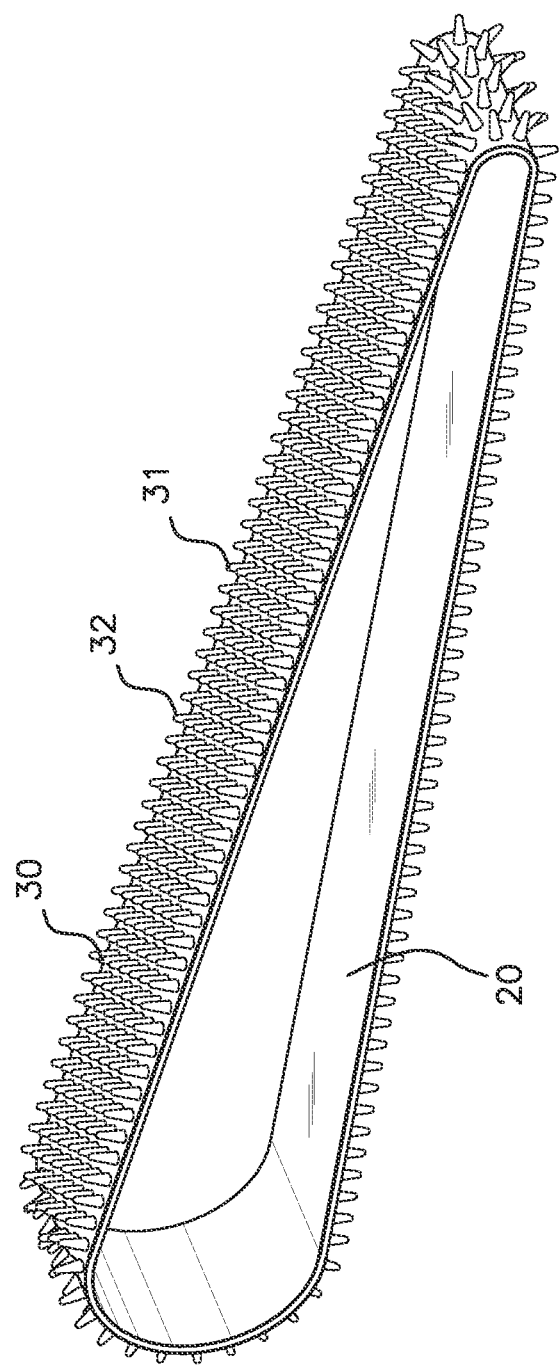

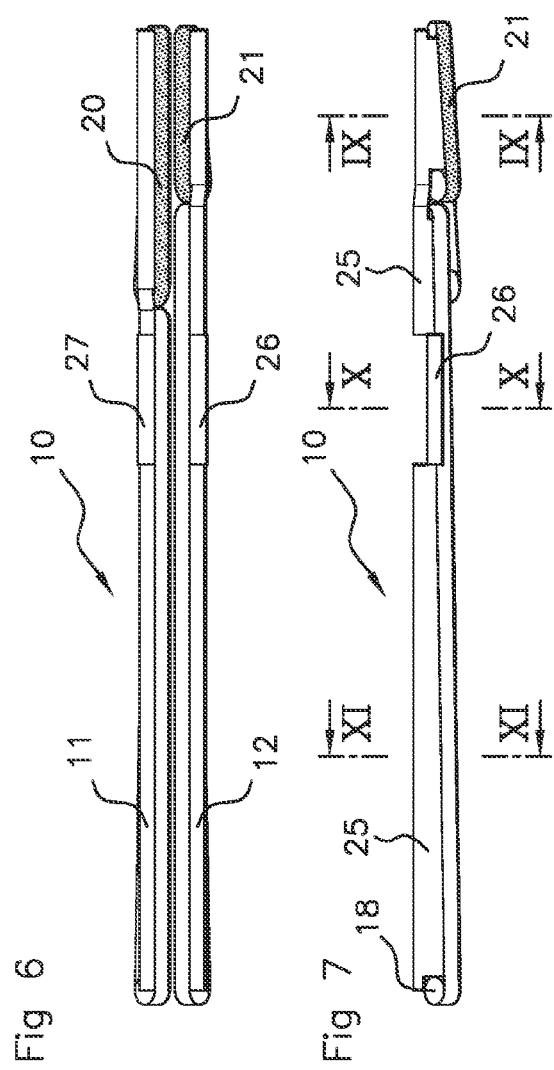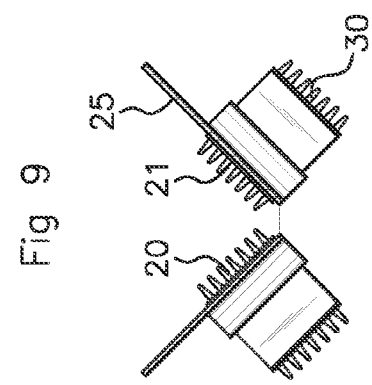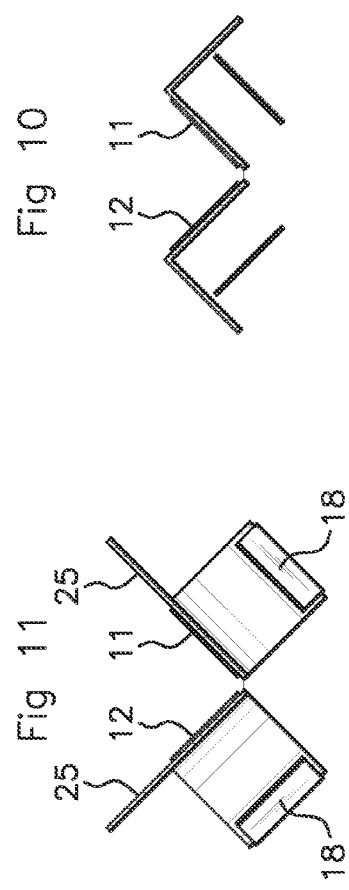

SINGULATOR

This invention relates to a singulator for use with fruit handling equipment and, in particular, a grader that includes a conveying system that includes fruit supports which carry fruit to be rotated past a photographic zone, weighed at a weighing zone and then ejected into appropriately positioned bins in dependence on the characteristics of the fruit as determined by the images taken at the photographic zone and the weight recorded at the weighing zone.

The term fruit as used herein embraces partspherical fruit and vegetables such as citrus fruits, apples, potatoes, tomatoes and like shaped articles.

BACKGROUND OF THE INVENTION

Singulators are traditionally used to feed the fruit in single file to the fruit handling equipment. Singulators usually comprise two belts arranged in a V configuration to operate at different speeds to rotate the fruit and assist the fruit to form a single row ready for transfer onto the fruit handling equipment.

Fruit does not move at the average speed of the two belts but at a speed somewhere between the speed of the two belts. When the feed to the V belts is maximised a continuous line of fruit forms where the difference between the mean fruit size and the pitch of the fruit supports of the grader means that the speed of the singulator needs to be slowed down to prevent overfeeding of the grader conveyor. Therefore, as fruit is transferred from the singulator to the grader there is commonly a speed difference which can result in damage to the fruit due to impact with the fruit supports.

Furthermore, there is no control over spacing between the fruit in a row. Thus it is usual to either get a continuous row of fruit in end to end contact or if infeed is reduced, groups of touching fruit are produced with gaps there between. In other cases it is necessary to reduce the speed of the singulator belts to prevent overfeeding of the grader which often results in two or more fruit (doubles) being deposited into each fruit support thus preventing proper grading of the fruit. A consequence of slowing down the singulator belt speeds to prevent doubles is a corresponding increase in the speed differential between the grader and the fruit as it comes off the singulator and therefore an increase in the impact forces on the fruit. The optimum speed for good singulation of fruit into a single row is not always the same as the speed of the grader rendering it impractical to run singulator belts at speeds which match the speed of the grader.

It is these issues that have brought about the present invention.

SUMMARY OF THE INVENTION

According to one aspect of the present invention, there is provided a singulator for use with a fruit handling equipment comprising spaced fruit supports driven at a particular speed, the singulator causing the fruit to assume a single file for transfer to the fruit supports, the singulator comprising a first pair of belts arranged in a V formation travelling at different speeds, wherein the first pair of belts merges into a second pair of belts arranged in a V formation, both travelling at about the speed of the fruit supports, and adapted to transfer the fruits to the fruit supports, whereby fruits are transferred to the fruit supports in single file whilst moving at about the same speed as the fruit supports.

Preferably there is a staggered transfer from the first pair of belts to the second pair of belts.

According to one aspect of the invention, the second pair of belts has energy absorbing means to stop rotation of the fruits. The energy absorbing means is preferably a plurality of projecting flexible barbs called proggles.

The invention also concerns a singulating method carried out by a singulator according to the invention.

DESCRIPTION OF THE DRAWINGS

An embodiment of the present invention will now be described by way of example only with reference to the accompanying drawings in which:

FIG. 5 is a perspective view of a belt forming part of the singulator, FIG. 6 is a plan view of the singulator, FIG. 7 is a side elevational view of the singulator, FIG. 8 is an end elevational view of the singulator, FIG. 9 is a cross sectional view taken along the lines A-A of FIG. 7, FIG. 10 is a cross sectional view taken along the lines of B-B of FIG. 7 and FIG. 11 is a cross sectional view taken along the lines of C-C of FIG. 7.

DESCRIPTION OF THE PREFERRED EMBODIMENT

Figure 3:
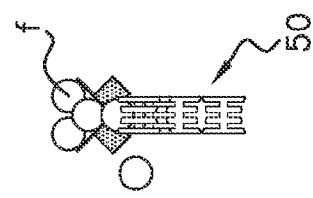
FIG. 3 is an end view of the singulator and conveyor.
Figure 1:
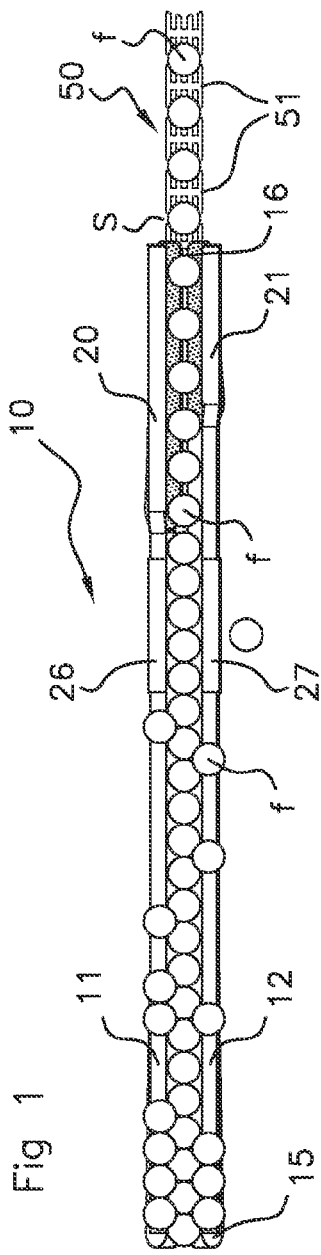
FIG. 1 is a plan view of a singulator feeding fruit to a fruit handling conveyor.
Figure 2:
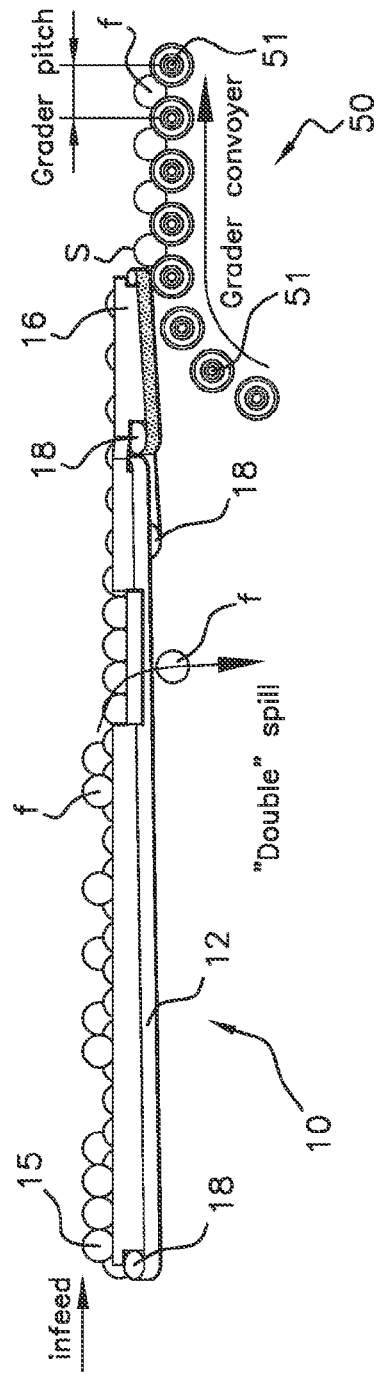
FIG. 2 is a side view of the singulator and conveyor.

FIGS. 1 to 3 show a singulator 10 merging into the entry of fruit handling equipment 50 in the form of a series of fruit supports in the form of spaced rollers 51 that are driven by a conveyor around a closed loop. The start S of the conveyor is shown on the right hand side of FIG. 2 and the purpose of the singulator 10 is to deliver a single fruit f into the space between each roller 51. The singulator 10 comprises a first pair of conveyor belts 11, 12 arranged in a V shaped orientation that mergers into a second pair of belts 20, 21 also arranged in a V shaped configuration. The singulator 10 has a common start or infeed position 15 and a common exit or outfeed position 16.

The first pair of belts comprise a 3 m length belt 11 in association with a 3.25 m length belt 12. These belts 11, 12 merge with the second pair whereby the shorter belt 11 merges with a longer belt 20. The belts 20, 21 of the second pair are respectively 1 m in length and 0.75 m resulting in a total length of the singulator 10 being 4 m and a staggered merge between the first and second pair of belts. Each belt 11, 12, 20, 21 is arranged at 45° and is about 40 mm wide. There is approximately a 10 mm gap at the base of the V. The width of the belt is selected so that the belts contain a single piece of fruit but not wide enough for a piece of fruit, called a "double" to travel up the sides of the V between the touching pieces of fruit.

It is understood that both the angle of the belts and the width and length of the belts may, in some designs be varied to suit different types, sizes and shapes of fruit. Each belt is held in a closed loop by rollers 18, 19 at each end of the belt. A larger drive roller 18 is located at the infeed end 15 with a smaller idler roller 19 being located at the outfeed end 16. The drive roller 18 is driven by an electric motor (not shown) via a speed controller.

The belts 11, 12 of the first pairs are manufactured to define a smooth flat conveying surface of rubber or plastics. The second pair of belts 20, 21 are proggle belts, that is rubber or plastics belts that have a plurality of spaced proggles 30 that are flexible rubber prongs that extend upwardly from the belt surface by about 8 mm. As shown in FIG. 5 the proggles 30 are arranged in spaced rows 31, 32 at a slight incline across the belt 20, or 21.

Figure 4:
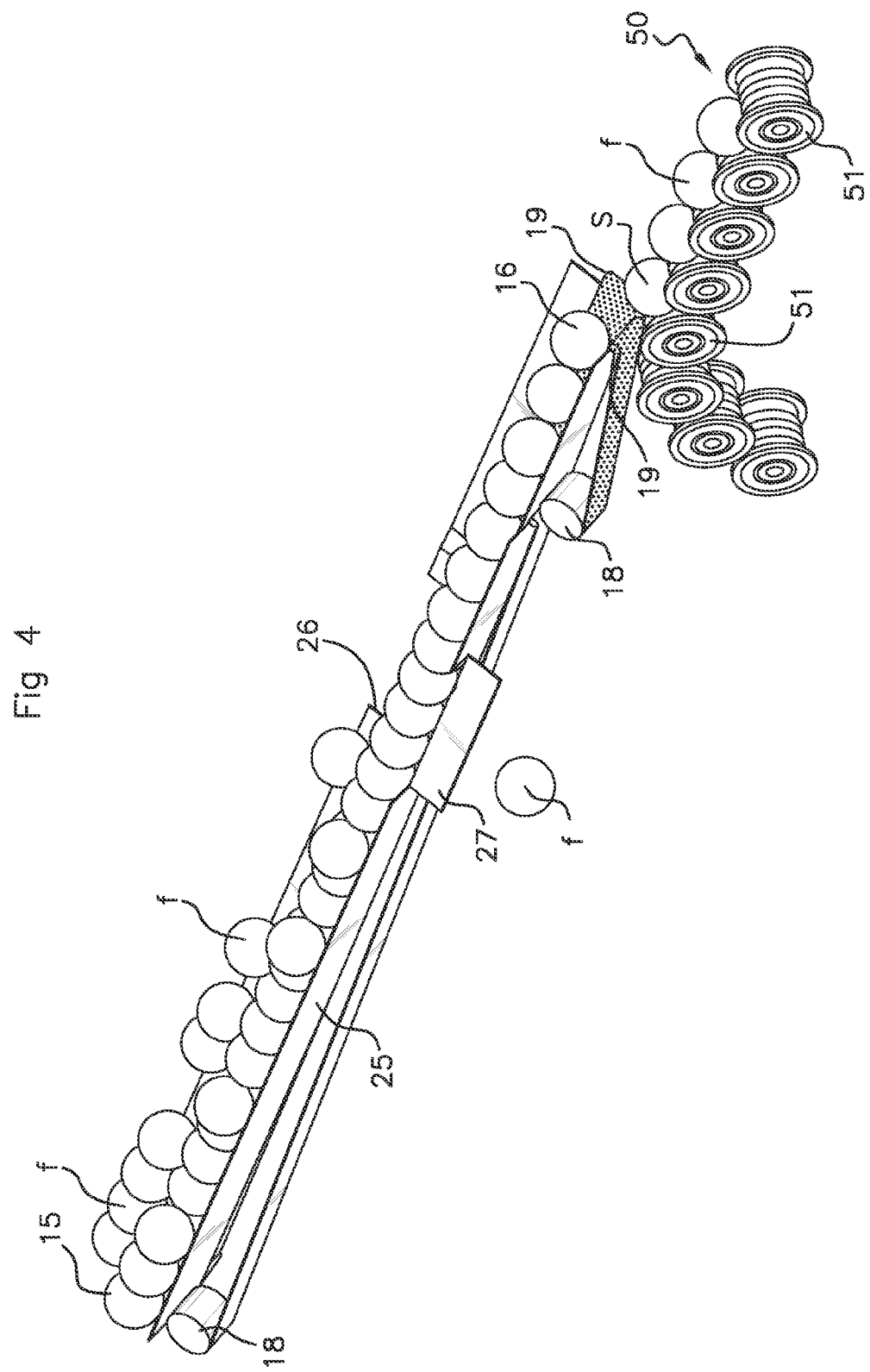
FIG. 4 is a perspective view of the singulator and conveyor.

As shown in FIG. 4 the first pair of belts are located in a V shaped frame 25 that has elongate apertures 26, 27 spaced on either side of the frame 25. In this manner, in the situation where fruit are not singulated and remain in a double configuration, the excess fruit f drops laterally through the gap defined by the aperture 26, or 27 so that there is little likelihood of a double reaching the rollers 51.

The first pair of belts 11, 12 are controlled to travel at different speeds to rotate the fruit f to cause, as shown in FIG. 4, the fruit to assume a single file. The speeds are selected based on the mean diameter of the fruit f and the pitch of the rollers 50. The second pair of belts 20, 21 rotate at the same speed as the rollers 51. Ultimately the singulator 10 is designed so that the fruit f leaving the singulator 10 is moving at the same speed as the rollers 51 meaning that there is no impact force caused by either the deceleration or acceleration of the fruit f as it leaves the singulator 10 to rest between the rollers 51.

The singulator 10 described above is particularly designed for use with very high speed fruit handling equipment, that is equipment that can run at speeds of approximately 20 fruit supports or cups per second.

Advantages

The addition of the second pair of "V" belts allows the first pair of "V" belts to still be operated at different speeds to each other. This assisting in forming a single row of fruit, whilst the second pair of "V" belts can be operated at similar or same speed with respect to each other, eliminating the uncertainty in fruit speed caused by two belts travelling at different speeds. This providing accurate control the speed of the fruit as it transfers to the fruit handling equipment (grader).

The second pair of "V" belts can be operated at similar or same speed as the grader thereby reducing or eliminating the speed difference between the fruit on the singulator and the grader rollers/cups and eliminating any impact on the fruit. The speed of the second pair of "V" belts can be matched to the same speed as the grader and the fruit is then effectively stationary with respect to the grader at the transfer point from the singulator to the grader irrespective of the grader speed. This feature becomes increasingly significant when attempting to operate the grader at higher speeds.

By using two pairs of "V" belts, the first pair of "V" belts effectively regulate the rate of flow of fruit onto the grader whilst the second pair of "V" belts controls the speed of the fruit at transfer point to the grader.

Additionally, when knowing the average diameter of the fruit based on feedback from the grader, it is possible to accurately control both the rate of fruit flow and spacing of the fruit as it transfers onto the grader, thereby preventing overfeeding of the grader whist allowing optimisation of roller/cup fill percentage. This is done based on the way it is possible to create a single row of fruit, all touching or in close proximity to each other on the first pair of "V" belts and then controlling the speeds of the second pair of "V" belts (or grader speed) such that the ratio of the average speed of the first pair of "V" belts to the second pair of "V" belts is based on the ratio of the average fruit size to pitch of the cups on the grader.

The use of proggles or other similar features to help prevent the fruit from rolling on the second pair of "V" belts assists in maintaining a gap between individual fruits created when fruit transfers from the slower first pair of "V" belts onto the faster second pair of "V" belts. The proggles also serve to cushion the force on the fruit as it accelerates.

By using different length "V" belts in each pair to create a step in the transfer between the first pair of "V" belts and the second pair of "V" belts and by making the longer of the first pair of "V" belts the faster of the pairs of belts the acceleration of the fruit occurs in two steps which results in gentler handling of the fruit.

The narrow width of the belts and presence of the gap in the side of the "V" belt frame causes the "double" fruit to be removed ensuring a single row of fruit at the transfer to the second pair of "V" belts or grader.

The claims defining the invention are as follows:

1. A singulator for use with fruit handling equipment comprising spaced fruit supports driven at a particular first speed, the singulator causing the fruit to assume single file for transfer to the fruit supports, the singulator comprising:
   a first pair of belts arranged in a V formation, a first belt of the first pair of belts travelling at a speed different from a speed of the second belt of the first pair of belts; and
   a second pair of belts arranged in a V formation and travelling at the same speed,
   wherein the first pair of belts merges into the second pair of belts,
   wherein both belts of the second pairs of belt travel at about the first speed of the fruit supports, and
   wherein the second pair of belts are adapted to transfer the fruits to the fruit supports such that the fruits are transferred to the fruit supports in single file whilst moving at about the same speed as the fruit supports.

2. The singulator according to claim 1 wherein a first belt of the second pair of belts is longer than a second belt of the second pair of belts, and the second pair of belts is off-set merged with the first pair of belts such that there is a staggered transfer from the first pair of belts to the second pair of belts.

3. The singulator according to claim 2 wherein the first pair of belts are located in a frame that has elongate apertures defining a gap through which fruit can escape from the singulator.

4. The singulator according to claim 1, where the second pair of belts comprise a plurality of projecting flexible barbs.

5. The singulator according to claim 4 wherein the barbs are in spaced rows extending across each of the second pair of belts.

6. The singulator according to claim 5 wherein the rows are inclined across across each of the second pair of belts.

7. The singulator according to claim 1 wherein the first pair of belts are located in a frame that has elongate apertures defining a gap through which fruit can escape from the singulator.

8. The singulator according to claim 1 wherein the second pair of belts run at a speed that is faster than the first pair of belts.

9. The singulator according to claim 1 wherein the belts are inclined at approximately 45° with a gap at a base of the belts.

10. A combination of the singulator of claim 1 and fruit handling equipment comprising spaced fruit supports driven at the first speed, the fruit handling equipment located downstream of the second pair of belts such that the singulator merges into an entry of the fruit handling equipment.

11. A singulator for use with spherical fruit handling equipment comprising spaced fruit supports driven at a first speed, the singulator causing the fruit to assume single file for transfer to the fruit supports, the singulator comprising:

a first pair of belts arranged in a V formation, a first belt of the first pair of belts travelling at a speed different from a speed of the second belt of the first pair of belts; and a second pair of belts arranged in a V formation and travelling at the same speed, wherein the first pair of belts merges into the second pair of belts, wherein both belts of the second pairs of belt travel at about the first speed of the fruit supports, wherein the second pair of belts are adapted to transfer the fruits to the fruit supports such that the fruits are transferred to the fruit supports in single file whilst moving at about the same speed as the fruit supports, and wherein the second pair of belts has cushioning elements that effectively prevent at least one of the group consisting of the group consisting of i) rotation of the spherical fruits and ii) slippage of the spherical fruits, to enable the fruits to be transferred to the fruit supports in single file whilst moving on the second pair of belts at about the same speed as the fruit supports.

12. The singulator of claim 11, wherein the cushioning elements comprise proggles, each proggle being comprised of an projecting flexible barb extending upwardly from a surface of a corresponding one of the second pair of belts.

13. The singulator of claim 11, wherein the cushioning elements comprise proggles arranged in spaced rows across each belt of the second pair of belts, each proggle being comprised of an projecting flexible barb extending upwardly from a surface of a corresponding one of the second pair of belts.

14. A combination of the singulator of claim 11, and fruit handling equipment comprising spaced fruit supports driven at the first speed, the fruit handling equipment located downstream of the second pair of belts with the singulator merging into an entry of the fruit handling equipment.

15. The singulator of claim 11, wherein, a first belt of the second pair of belts is longer than a second belt of the second pair of belts, and the first belt of the second pair of belts is merged further into the first pair of belts than the second belt of the second pair of belts is merged into the first pair of belts such that there is a staggered transfer of the fruit from the first pair of belts to the second pair of belts.

16. The singulator of claim 11, further comprising a frame with elongate apertures that each define a gap through which fruit can escape, and wherein the first pair of belts are located in the frame.

17. The singulator according to claim 11, wherein wherein each of the belts are inclined at approximately 45° with a gap at a base of each pair of belts.

18. The singulator of claim 11, wherein, wherein the cushioning elements effectively prevent both the i) rotation of the spherical fruits and ii) slippage of the spherical fruits whilst moving one the second pair of belts, the cushioning elements comprise proggles arranged in spaced apart rows at an incline across each belt of the second pair of belts, each proggle being comprised of an projecting flexible barb extending upwardly from a surface of a corresponding one of the second pair of belts, and a first belt and second belts of the second pair of belts have different lengths, and the first belt of the second pair of belts is merged further into the first pair of belts than the second belt of the second pair of belts is merged into the first pair of belts such that there is a staggered transfer of the fruit from the first pair of belts to the second pair of belts.

19. A combination of the singulator of claim 18, and fruit handling equipment comprising spaced fruit supports driven at the first speed, the fruit handling equipment located downstream of the second pair of belts with the singulator merging into an entry of the fruit handling equipment.

* * * * *